(No Model.)
C. M. MALLORY.
HAY ELEVATOR.
No. 282,654.     *Fig. 1.*     Patented Aug. 7, 1883.
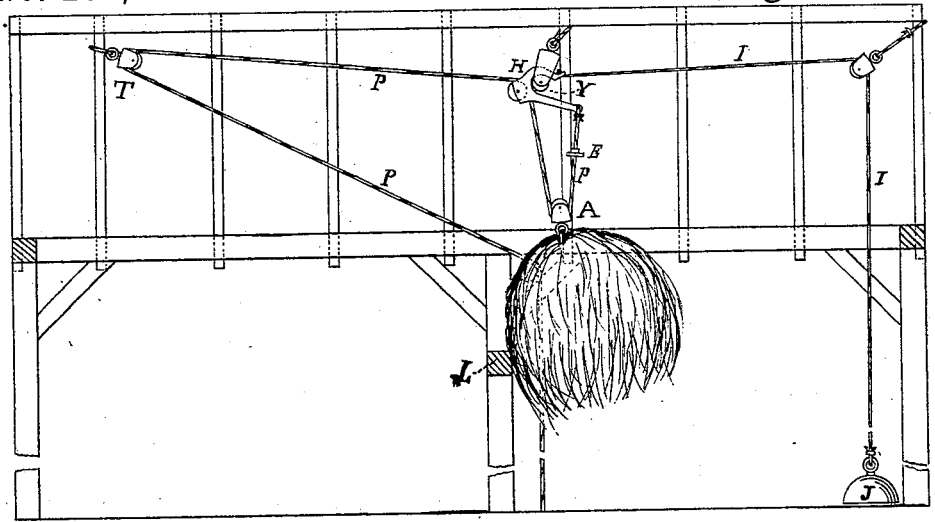
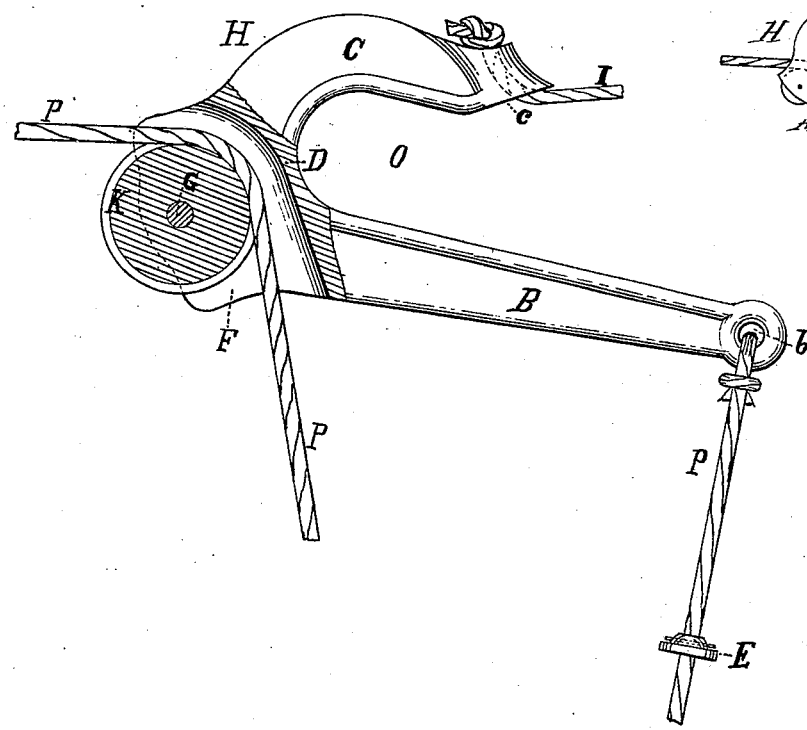
WITNESSES:
D. C. Walter.
Isaac Church.
INVENTOR
C. M. Mallory

UNITED STATES PATENT OFFICE.

CHARLES M. MALLORY, OF TOLEDO, OHIO.

HAY-ELEVATOR.

SPECIFICATION forming part of Letters Patent No. 282,654, dated August 7, 1883.

Application filed March 26, 1883. (No model.)

*To all whom it may concern:*

Be it known that I, CHARLES M. MALLORY, of Toledo, in the county of Lucas and State of Ohio, have invented a new and Improved Hay-Elevator, of which the following is a specification.

The object of my invention is to provide a hay-elevator of improved construction, and by which the hay may be delivered at the end and sides of the mow, thereby saving labor in mowing away the hay.

In the accompanying drawings, Figure 1 represents an elevation of my improved hay-elevator put up in working position in a barn, the latter being shown in vertical section. Fig. 2 is a detail section of the tilting hoister or conveyer. Fig. 3 represents the hoister in a tilted position.

Similar letters of reference indicate corresponding parts.

Y is the fulcrum and guide-pulley, which is attached at roof of barn to a pair of rafters adjacent to mow, serving as support for the hoister H while hoisting a fork full of hay from wagon.

H is the tilting hoister, constructed of the pulley-block D, support-hook C, tilting arm B, lugs F, and pulley K. The pulley K is secured between the lugs F by rivet G for receiving the hoisting-rope P. The support-hook C is perforated at *c* for attaching the end of counterbalance-rope I. The tilting arm B is perforated at *b* for attaching the end of the hoisting-rope P.

When the hoister H is suspended upon the pulley Y, the latter is lodged in opening O of hoister, the hook C being drawn over said pulley by counter-balance J, attached to the rope I. The hoister H is tilted and held in a tilted or hooked position upon support-pulley Y by the strain of hoisting-rope P, acting upon the end of the tilting arm B in hoisting a load. When the hay is hoisted high enough to allow hoisting-pulley A to come in contact with stop E, (or any suitable stop attached, preferably, to hoisting-rope, tilting arm, or hoisting-pulley,) the strain is entirely released from tilting arm, thus allowing the hoister (Fig. 3) to unhook from support-pulley Y. Then it swings over the cross-beam L of barn with fork full of hay, and is taken, by horse hitched to hoisting-rope P, back to pulley T, which may be placed at any part of the mow. When the fork is tripped, releasing it from the hay, and horse backed, the weight J descends, causing hoister H to return promptly, guided by weight-rope I, to support-pulley Y, ready for another load.

The tilting hoister H is hooked over and held upon the support-pulley by the strain of the hoisting-rope P, acting upon the end of tilting arm B, thereby tilting and holding said hoister in a tilted position while hoisting a fork full of hay. When the hay is hoisted high enough to allow hoisting-pulley A to come in contact with the stop E, the strain is entirely relieved from tilting arm, thus unhooking and detaching the hoister or carrier from support.

Having thus fully described my invention, I claim as new and desire to secure by Letters Patent—

1. The tilting hoister H, constructed of the combination of the block D, the perforated support-hook C, the perforated tilting arm B, the opening O, the lugs F, and the pulley K, secured by rivet G, substantially as described, and for the purpose specified.

2. A tilting hoister, in combination with a suitable stop for operating the same, attached preferably to hoisting-rope, tilting arm, or hoisting-pulley, substantially as and for the purpose set forth.

3. The tilting hoister H, supported by hooking it over the pulley Y, substantially as described, and for the purpose specified.

CHARLES MARTIN MALLORY.

Witnesses:
D. C. WALTER,
ISAAC CHURCH.